United States Patent [19]

Smith

[11] Patent Number: 4,748,201
[45] Date of Patent: May 31, 1988

[54] SPRAYABLE POLYURETHANE COMPOSITION AND METHOD OF PREPARATION

[75] Inventor: Stuart B. Smith, Conyers, Ga.

[73] Assignee: Urylon Development, Inc., Conyers, Ga.

[21] Appl. No.: 845,453

[22] Filed: Mar. 28, 1986

[51] Int. Cl.$^4$ .............................................. C08G 18/30
[52] U.S. Cl. .................................. 524/712; 524/874; 524/875; 528/51; 528/55; 528/56; 528/58; 528/80; 528/85
[58] Field of Search ...................... 524/712, 874, 875; 528/51, 55, 56, 58, 80, 85

[56] References Cited

U.S. PATENT DOCUMENTS 4,080,318  3/1978  Smith et al. ............................ 528/80
4,251,427  2/1981  Recker et al. ........................ 524/875

Primary Examiner—Maurice J. Welsh
Assistant Examiner—Sam A. Acquah
Attorney, Agent, or Firm—Richard P. Crowley

[57] ABSTRACT

An aromatic, isocyanate-base, polyurethane polymer and a process for preparing the polymer. The process comprises reacting, such as by spraying onto a substrate or an open mold, a caprolactone polyol with a methylene dipara phenylene isocyanate in the presence of a catalytic amount of a metallo catalyst, and a fast-curing and cross-linking amount of a curing agent comprising a polyalkanol amine, particularly a triethanol amine, to provide a fast-reaction aliphatic poilyurethane polymer. The reaction of difunctional caprolactone polyols with low functionality MDI in the presence of a tin catalyst and triethanol amine provides for flexible and rigid polymer films of substantially no porosity.

24 Claims, No Drawings

SPRAYABLE POLYURETHANE COMPOSITION AND METHOD OF PREPARATION

BACKGROUND OF THE INVENTION

Conventional urethane-type polymers are prepared by the reaction of a polyol or a polyol-based compound with an isocyanate, typically in the presence of a metallo catalyst, and a curing agent, such as an amine. Caprolactone-type polyol polymers have been suggested for reaction wtih isocyanates, such as TDI and MDI, in the presence of various metallic catalysts, such as organo metallic catalysts comprising tin, lead and zinc and combinations thereof with a triethylene diamine curing agent (that is, Dabco, a trademark of Air Products and Chemical Co.). However, when these catalysts are employed with an aliphatic isocyanate, together with a caprolactone polyol, a very slow-curing polymer results. While various combinations of the metallic catalyst may vary the curing time, such as the combination of both lead and tin, the reaction time to prepare the aliphatic isocyanate base polymers is still quite slow, typically 2 to 24 hours or more.

Where the caprolactone polyols have been reacted with TDI or MDI in the presence of a tin catalyst and a triethylene diamine curing agent, the caprolactone polyol supplier has reported that polyurethanes of superior properties are produced. However, it has been found that such polymers provide for only flexible-type polymers, and that such polymers produce porous-type films and coatings.

Solid polyurethanes, both elastomeric and rigid, have been produced in many different formulations as polyesters and polyethers; however, polyurethanes of zero or substantially zero porosity and polyurethanes in thin-film or coating form, on which a vacuum could be pulled and held, have not been available commercially. Rim-molding and open spray-molding applications can usefully employ both rigid and flexible polymeric materials without porosity, such as for applications like roof membranes, spraying films onto metals for corrosion control, boats, bath tubs and other film and coating use applications.

Therefore, it is desirable to provide solid polyurethanes which may be used in flexible or rigid form in RIM-molding and open mold-spraying techniques, and which polyurethanes are fast-reacting and which may also have low or zero gas porosity.

SUMMARY OF THE INVENTION

The invention relates to a fast-reacting process of preparing solid polyurethane polymers and to the polymers so prepared. In particular, the invention concerns a process of preparing solid polyurethanes in a fast-reacting process, which enables the polymer to be employed in RIM or spray-molding processes, and to produce nonporous films and coatings.

It has been discovered that fast-reacting polyurethanes may be produced by reacting a caprolactone polyol with an MDI in the presence of a metal catalyst, and also in the presence of a fast spray-curing amount of a polyalkanol amine catalyst and cross-linking agent. More particularly and preferably, the catalyst and agent comprise triethanol amine, to provide a fast-reacting isocyanate caprolactone polymer, having a reaction time of about 10 to 15 seconds or less. The polymer of the invention is easily prepared by reacting, such as by mixing; for example, spraying, A- and B-side compositions together into a reactive spray mixture onto an open or into a closed mold; that is, a RIM-type process, or onto a mold surface or onto a gel or other polymeric surface on the open mold. The A- and B-side components may be reacted, such as by spraying, to form a molded part or a film or coating, which subsequently may be coated or otherwise treated.

It has been discovered that the employment of polyalkanol amines, more particularly polyethanol amines, such as the diethanol and triethanol amines and combinations thereof, when employed in a curing and cross-linking amount, in combination with certain metallo, such as organo metallic, catalysts, provides for reaction of the MDI with a caprolactone polyol, very fast reaction times, typically less than 15 seconds, and more typically less than 5 to 10 seconds, at about 140° F. The resulting solid polyurethane polymer may be prepared as a flexible or rigid polymer. It has been found that the combination of the triethanol amine curing agent with a tin or lead catalyst or combination, provides for a fast reaction, resulting in a polymer with excellent properties, particularly useful for RIM and spray-type, open-molding processes.

The process of the invention provides for preparing the polymers, by reacting substantially about a stoichiometric, or a slight excess of the MDI, such as an excess of up to 20%, and more typically 5% to 10%, with a caprolactone polyol, typically a dipolyol or a tripolyol. The reaction is carried out in the presence of a catalytic amount of a reaction catalyst; for example, an organo metallic catalyst, such as a fatty-acid or fatty-acid alkyl organo metal catalyst, and more particularly a multivalent metal catalyst, such as tin or lead. Further and importantly, the process is carried out in the presence of a curing and cross-linking amount of a polyalkanol amine curing catalyst.

It has been found that reacting the caprolactone polyol with MDI, employing tetravelent tins or lead naphthenate-type catalysts, alone, results in a slow-curing porous polymer. It has been found that various other amine-type catalysts, such as triethylene diamine and diethyl toluene diamine, are not suitable as the curing catalysts of the invention, in that such catalysts either produce a very slow cure or produce porous-type films and coatings, or both, associated with their use. The employment of the polyalkanol amines; for example, polyethanol, polypropanol amines, as a primary curing catalyst, and particularly triethanol amines, in the system is unique and highly advantageous and provides unexpected results, particulary with the difunctional caprolactone polyols.

The curing catalyst employed comprises polyalkanol amines, and particularly diethanol and triethanol amines. The polyethanol amines are available in substantially pure 99% triethanol amine form, or more typically in a mixture of about up to 25% by weight of diethanol amine, up to 5% monoethanol amine, and the remainder triethanol amine. The preferred curing agent comprises triethanol amine used in the pure form. The polyalkanol amines may be used alone or in combination with other curing agents. The amount of the amine catalyst of the invention should be sufficient to ensure a reaction in generally less than 15 seconds, but typically less than 5 to 10 seconds. The amount of the amine used may vary. The amine catalysts of the invention are generally employed in the B-side component and range from about 0.5% to 15% by weight of the total weight of the formulation; for example, 1% to 10%, or ranges from about 15% to 25% by weight of the B-side component.

The isocyanate employed in the process comprises methylene diparaphenylene isocyanates (MDI), such as diphenyl methane 4,4' diiocyanate. The functionality of the MDI may vary; however, a low functionality-type MDI is preferred, such as an MDI having a functionality of less than 2.7; for example, 2.0 to 2.5, such as about 2.1 or less.

The heterocyclic imine lactam polyols employed in the practice of the invention comprise preferably one or a combination of caprolactone polyols. The caprolactone polyester polyols employed are typically difunctional or trifunctional polyols having only primary hydroxyl groups, and having generally a hydroxyl number ranging from about 180 to 600. The caprolactone polyols provide for polymers having good tensile strength and controlled functionality. The caprolactone polyols, useful in the invention, are commercially available as Tone$^{TM}$ polyols (a tradmark of Union Carbide Corporation). The caprolactone polyols particularly useful in the preparation of the polymers of the invention comprise those trifunctional and difunctional, polyols, which are generally liquid at temperatures of about 20° C. or below. While the more solid, caprolactone polyols may be employed, such polyols must be heated or solubilized, which is a disadvantage in using such polyols.

It has been found that the use of difunctional caprolactone polyols with MDI, in the presence of tin and lead catalysts and a curing amount of triethanol amine, unexpectedly provides for films and coating of zero or substantially zero porosity, and that, by varying the amount of polyalkanol amine and polyol, flexible to rigid nonporous polyurethanes can be prepared. In such reactions, films and coatings as thin as 5 mils can be formed, which films and coatings are nonporous and can stand a vacuum of up to $10^{-6}$ Torrs. The difunctional caprolactone polyols of low molecular weight; for example 600 or less, with a low hydroxyl number; for example, 180 to 220, are particularly useful in reaction with low-functionality MDI, to provide rigid or flexible coatings without porosity, and which films and coatings hold a vacuum. The trifunctional caprolactone polyols react quickly with MDI in the presence of the tin catalyst and the triethanol amine curing agent, but provide rigid-type coatings which exhibit gas porosity. The amount of the polyalkanol amine curing agent to the amount of the caprolactone polyol controls the degree of rigidity of the resulting polymer. As the amount of triethanol amine increases, the rigidity of the polyurethane produced increases. While not wishing to be bound by any theory of operation, it is believed that the use of polyalkanol amines with the caprolactone polyol and MDI mixture provides a very fast reaction of gelling and cross-linking, without the production of gases in the reaction which promotes coating porosity. Other types of amine curing catalysts are not satisfactory in providing nonporous coatings and films with difunctional caprolactone polyols, due to the tendency of such amine agents and other catalysts to react with moisture, or to be slow to permit the formation of ases in the reaction mixture. The use of polyethanol amine as a curing agent makes all primary hydroxyl polyols gel instantly without a gassing reaction. The use of triethylene diamine is not satisfactory in producing nonporous polymers, since a blowing-type reaction occurs.

The amount of the polyol used for reacting with the prepolymer as a B-side component may vary, but typically the reaction is based on about a stoichiometric amount, or slightly less, of the polyol with MDI. Generally, the MDI is employed in an amount ranging from about 50 to 200 parts, typically 60 to 130 parts, per 100 parts of the caprolactone polyol. Generally, the higher the amount of the MDI, the higher the amount of the rigidity in the resulting polymer. Caprolactone polyester polyols, which are presently commercially available, have an average molecular weight ranging from about 500 to 3000 for the difunctional polyols and from about 300 to 900 for the trifunctional polyols and a hydroxyl number of 180 to 560. The polyols undergo reactions expected of a primary alcohol functionality, including reaction with isocyanates.

The reaction of the A- and B-side components in the process of the invention is carried out in the presence of a catalyst, with typically the catalyst placed in the B-side component. The catalyst employed usually comprises a single-stage catalyst which provides for a rapid and very high exotherm; for example, over 210° F., in less than about 10 seconds. Suitable catalysts for use in the process comprise, but are not limited to, organo metal catalysts, such as fatty-acid-alkyl esters or naphthenates of polyvalent metals, such as tin, zinc and lead. The catalyst may be used alone or in combination. The amount of the catalyst used in the process may vary, such as, for example, ranging from 0.01 to 2 parts per 100 parts of the polyol; for example, ranging from about 0.05 to 0.5. The preferred catalyst comprises a tin-dialkyl-di fatty-acid catalyst.

Minor amounts of other additives may be employed in connection with the A and B components, such as, for example, but not limited to, the use of flame-retardant agents to enhance or impart desirable flame-resistant or flame-performance properties to the resulting spray polymer. Flame-retardant agents which may be employed include, but are not limited to, hydrated silicas and alumina, as well as organic-type flame-retardant agents, such as, for example, phosphates, halogenated compounds and more typically halogenated phosphate esters, such as, for example, polychloro phosphate esters, generally added to the B-side component, to reduce the viscosity and also to reduce flame spread of the polymer. In addition and importantly, moisture-scavenging agents may be incorporated, in order to reduce or prevent foaming. For example, it has been found that the employment of molecular sieves or other moisture-scavenging agents may be employed, to eliminate foam tendency. The use of moisture-scavenger agents is preferred, when nonporous films and coatings are desired. In one embodiment, it has been found that dehydrated molecular-sieve particles, with an alkali cation suspended in a liquid suspending agent, such as a glycerine, may be added to the B-side component, to eliminate any tendency to foam. Also, acid scavengers may be added to reduce the tendency of flame retardants, particularly halogenated agents, to cause hydrolysis and the formation of acids. Suitable acid scavengers have been found to be epoxy resins, such as cyclic aliphatic epoxides, which react with the acid formed.

Where a polymer of increased flexual modulus and reduced shrinkage is desired, strengthening-type agents may be incorporated, either in the A- or B-side component, or introduced into the reaction mixture or into the spray pattern, to provide such enhanced flexual modulus, such as a fibrous or particulate-type material. Materials, which can be employed, include a wide variety of fibers, and more particularly glass fibers, such as chopped or woven glass fibers. The glass fibers may be chopped into short fibers by a chopper above or adjacent the exit nozzle of the spray equipment, so that the chopped glass falls onto the reaction mixture exiting from the nozzle tip of the spraying equipment. In addition, particulate materials may be employed, as well as other additive materials, such as pigment dyes, carbon particles, carbon fibers, synthetic fibers, and various other additives.

The reaction mixture of the process may be sprayed or poured, to produce a solid film or coating on a variety of substrates, since the reaction mixture adheres well to a variety of substrates, or can be made to release from substrates by the use of mild release agents. Generally, the process is carried out by spraying together the A- and B-side components into a closed mold, such as in a RIM-type process, or more particularly onto an open mold surface, and more generally onto a gel coat mold, such as a polyester gel coat or acrylic molds. It has been found that the process may be carried out by spraying the A- and B-side components onto a gel coat made, for example, of a neopentyl glycol resin or onto a vacuum-formed acrylic part, or onto a polyester resin substrate containing chopped fiberglass, or onto other polymer gel-type precoats in an open-molding process, with excellent release. Also, thin coatings and films may be formed by spraying the A- and B-side components together onto a smooth release surface, such as glass.

Thus, the process of the invention and the resulting polymer are usefully employed in spraying open-mold techniques onto glass fiber or polymeric substrates, with good adhesion and stiffness. The polyurethanes of the invention, with the tin catalyst and triethanol amine agent, result in a fast-curing polymer, with the finished polymer clear in color and, when pigmented, shows excellent color and light stability. The process of the invention provides a substantially full cure time in less than 5 minutes, and typically about 1 to 2 minutes, and also provides for rapid demolding of the part from the mold. The process provides for open or closed-mold parts which range from flexible to rigid, but not excessively bittle, and which have high mold green strength.

The polymers may be produced in various colors, such as white or light or other colors, even dark pigments, by the use of pigments incorporated in the Ccomponents. Generally, where a light or white-colored polymer is desired, a pigment is incorporated in the B-side component, such as a metallic salt, such as a metallic oxide; for example, one pigment would comprise titanium dioxide. The pigments are used in an amount alone or in combination, to obtain a desired color, but generally range from up to 30 parts per 100 parts of the B-side component, such as 1 to 15 parts, such as 2 to 10 parts.

Where moisture-scavenging or acid-scavenging agents are employed, such as in the preparation of solid spray films and coatings, the amount of the agent may vary, depending on the amount of the moisture or acid; however, amounts ranging from about 0.5 to 15 parts; for example, from 5 to 10 parts, per 100 parts of MDI, may be employed. Further, where strengthening particles of fibers, such as glass fibers, are introduced into the reactive spray, amounts ranging from up to about 30% by weight of glass fibers, and more typically from about 10 to 25 parts per weight, of the isocyanate may be employed as glass fibers. Surfactants, such as non-ionic surfactants, may be employed, to aid in dispersion of the components generally in the B side at 0.1 to 5 parts; for example, 0.5 to 4 parts, per 100 parts of the B side.

The invention will be described for the purpose of illustration only in connection with certain embodiments; however, it is recognized that various changes, modifications, additions and improvements may be made by those persons skilled in the art, all falling within the spirit and scope of the invention.

DESCRIPTION OF THE EMBODIMENTS

EXAMPLE 1

A- and B-side component compositions were prepared as follows:

A side 83 parts by weight (pbw) of MDI having a functionality of 2.1 (Mobay CD MDI)

B side 100 pbw caprolactone difunctional polyol, average molecular weight 200, hydroxyl No. 180-218 (Tone 0201 of Union Carbide Corporation)

10 pbw triethanol amine (99% pure)

0.1 pbw dibutyl tin dilaurylate 3.5 pbw moisture-scavenging agent—molecular sieve in oil (L-paste Bayer Co.)

The two components A and B were heated to 120° F. and pumped at high pressure to an impingement mixing gun with a spray nozzle. The material was sprayed onto a sheet of glass $2 \times 4'$. Two coated flexible sheets were made in thickness of 250 and 10 mils.

The sprayed material gelled in 3 seconds and was tack-free in 20 seconds. The sprayed sheets were removed from the glass after 120 seconds. A vacuum of $10^{-6}$ Torrs was pulled on each sheet. Helium gas was placed on the back side and a helium gas detector on the vacuum side, and no helium was detected. A water-vapor permeation test showed no passage of water vapor. The sheets had high tear strength and high tensile and impact strength.

EXAMPLE 2

Example 1 was repeated using 15 pbw of TEOA and 98 pbw of the MDI. The same results were obtained, except the film or sheets were increased in stiffness.

EXAMPLE 3

Example 1 was repeated, except the amount of TEOA was increased to 25 pbw and the DMI to 128.5 pbw. The same result as in Example 1 were obtained, except the film-sheets were stiff.

EXAMPLE 4

Example 1 was repeated, except the amount of TEOA was increased to 35 pbw and the DMI to 156.6 pbw. The resulting polymer was quite hard like glass, but with a Barcol hardness reading of 45. The polymer was unusual in that the polymer was not bittle and had good impact strength.

EXAMPLE 5

Example 1 was repeated, except the TEOA curing agent was omitted, and 74.5 pbw of the MDI used. The resulting product was a slow-curing film which was very flexible. No vacuum was able to be produced, with the permeation test showing 0.5 perms.

EXAMPLE 6

Example 1 was repeated using a trifunctional caprolactone polyol Tone 0301 having a hydroxyl number of 560 and an average molecular weight of 300. The resulting sheet product was a slow-curing rigid film having gas porosity. No vacuum was able to pull on the sheet, and the sheet was brittle on impact.

EXAMPLE 7

Example 1 was repeated using 1,4 butane diol in place of the difunctional caprolactone polyol. The resulting sheet polymer was a strong, slow-curing film product with porosity.

EXAMPLE 8

Example 1 was repeated, except diethyl toluene diamine (Detda) was used in place of TEOA. The gelation was very fast, but curing time was slower. The sheet product was porous and the white color was now a brown to yellow color.

EXAMPLE 9

Example 1 was repeated, except triethylene diamine (Dabco) was used in place of TEOA. The sheet product appeared the same, but the sheet was porous and did not hold a vacuum.

EXAMPLE 10

Example 1 was repeated using a 2.4 functionality MDI (Rubicon 182) with excellent results.

The examples show that flexible and rigid coatings can be prepared with tirethanol amine as the curing agent, with MDI and difunctional or trifunctional caprolactone polyols. The coatings can be spray-applied and have great strength and rigid materials can be produced without brittleness. The use of difunctional caprolactone polyols provides for film, sheet and coating products of no porosity. Where flame retardants are used, acid scavengers are recommended, to minimize hydrolysis and blowing effects. The use of water scavengers is recommended, but not wholly necessary, to ensure no moisture pickup by the polyols, so that moisture does not produce a nonporous product.

What is claimed is:

1. In a process for preparing a fast-reacting polyurethane which process consists essentially of reacting about 50 to 200 parts by weight of MDI with a caprolactone polyol in the presence of a catalytic amount of a metal catalyst and an amine curing agent, to provide a reaction composition to produce a fast-reacting polyurethane polymer, the improvement which comprises employing as the curing agent a polyalkanol amine curing agent in a curing amount sufficient to provide a reaction time of about 15 seconds or less.

2. The process of claim 1 wherein the MDI comprises an MDI having a functionality of about 2.5 or less.

3. The process of claim 1 wherein the caprolactone polyol has a hdyroxyl number ranging from about 180 to 600.

4. The process of claim 1 wherein the caprolactone polyol is a difunctional liquid polyol.

5. The process of claim 1 wherein the metallic catalyst comprises an organo metallic salt selected from the group consisting of lead, tin and combinations thereof.

6. The process of claim 1 wherein the catalyst comprises a dialkyl di fatty acid tetravalent 7 in salt.

7. The process of claim 1 wherein the polyalkanol amine comprises a triethanol amine, a diethanol amine or a mixture thereof.

8. The process of claim 1 wherein the triethanol amine is present in a curing amount, to provide for a reaction time of less than 5 seconds.

9. The process of claim 1 which includes carrying out the reaction in the presence of a color-producing amount of a pigment.

10. The process of claim 11 wherein the pigment comprises from about 1 to 30 parts by weight of titanium dioxide per 100 parts of the reaction mixture.

11. The process of claim 1 which includes carrying out the reaction in the presence of a flame-retardant amount of a flame-retardant agent.

12. The process of claim 11 which includes carrying out the reaction in the presence of a hologenated phosphate or a hologenated phosphate flame-retardant agent.

13. The process of claim 1 which includes preparing an A-side composition containing the MDI and a B-side composition containing the caprolactone polyol, the catalyst and the curing agent, and spraying the A- and B-side compositions into a mold or onto a substrate surface.

14. The process of claim 13 which includes spraying the A- and B-side compositions as a coating layer onto a substrate.

15. The process of claim 1 wherein the caprolactone polyol comprises a liquid difunctional polyol having a hydroxyl number of about 180 to 220, and wherein the amine curing agent comprises a triethanol amine.

16. The process of claim 1 which includes carrying out the reaction in the presence of a moisture-scavenger amount of a moisture-scavenger agent.

17. The nonporous aliphatic urethane polymer prepared by the process of claim 1.

18. The nonporous sprayed urethane-coated substrate prepared by the process of claim 13.

19. The nonporous polyurethane polymer prepared by the process of claim 15.

20. A process for preparing a fast-curing, nonporous polyurethane polymer, which process consists essentially of preparing A- and B-side compositions and spraying the A- and B-side compositions together onto a substrate, wherein the A-side composition comprises 50 to 200 parts of an MDI having a functionality of about 2.5 or less, and the B-side composition comprises a catalytic amount of a tin or lead organo-metal catalyst, 100 parts by weight of a liquid difunctional caprolactone polyol, a curing amount of a polyethanol amine curing agent and a moisture-scavenger amount of a moisture-scavenger agent, to provide a reaction in about 10 seconds or less.

21. The nonporous polyurethane polymer prepared by the process of claim 20.

22. The process of claim 1 wherein the polyalkanol amine comprises a substantially pure 99% triethanol amine.

23. The process of claim 1 wherein the polyalkanol amine comprises from about 0.5% to 15% by weight of the reaction composition.

24. A urethane polymer sheet material prepared by the process of claim 20, and wherein such sheet material is a substantially nonporous sheet product.

* * * * *